Sept. 19, 1933.   M. C. FERRANDO   1,927,701
COFFEEPOT
Filed March 7, 1932

INVENTOR
MAURICE C. FERRANDO
BY
ATTORNEY

Patented Sept. 19, 1933

1,927,701

UNITED STATES PATENT OFFICE 1,927,701

COFFEEPOT

Maurice C. Ferrando, New York, N. Y., assignor to Emma V. Husson, Brooklyn, N. Y.

Application March 7, 1932. Serial No. 597,169

4 Claims. (Cl. 53—3)

This invention relates to new and useful improvements in a coffee pot.

The invention has for an object the construction of a coffee pot which is characterized by a mixer extended through the cover thereof and including a pair of straining elements mounted within the coffee pot.

More particularly, the invention proposes an arrangement whereby one of the straining elements has coarse and the other fine passages.

Furthermore, it is proposed to arrange the strainer in a manner so that it may be supported at various elevations.

The invention has for a still further object the construction of a device of the class described which is of simple durable construction, dependable in use and efficient in operation and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of the disclosure:—

Figure 1:
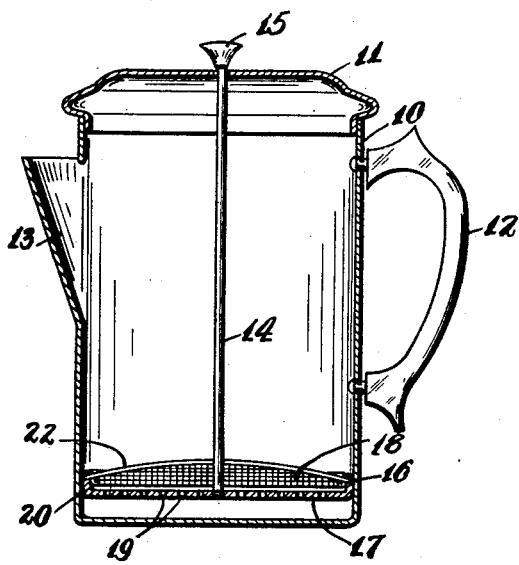
Fig. 1 is a vertical sectional view of a coffee pot constructed according to this invention.
Figure 2:
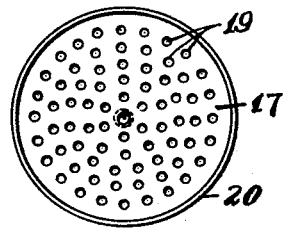
Fig. 2 is a plan view of one of the straining elements.

The coffee pot, according to this invention, comprises a pot 10 having a handle 12 and secured upon one side of the pot diametrically opposite a pouring spout 13. A rod 14 is slidably extended through the cover 11. A knob 15 is mounted upon the top end of the rod. A straining element 16 is secured upon the lower end of the rod 14.

The straining element 16 is composed of a bottom perforated disc 17 and a top disc 18 constructed mainly of gauze. The bottom disc 17 is formed with relatively large openings 19 when compared with the passage through the gauze so that the condition is had where the bottom disc restricts large pieces while the top one small pieces and thus accomplishes good straining.

From the bottom disc 17 there projects a peripheral flange 20 in which the top disc 18 is mounted. The disc 18 is composed of a frame 21 of ring shape, reinforced by radial arms 22. The top disc is forced into place within the flange 20 and frictionally maintains its position so that the parts may be separated whenever desired for washing.

Figure 4:
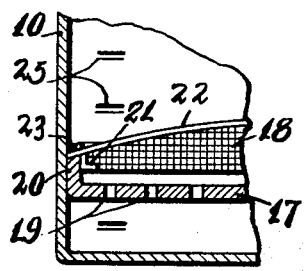
Fig. 4 is a fragmentary view similar to a portion of Fig. 1 but illustrating a modification.
Figure 3:
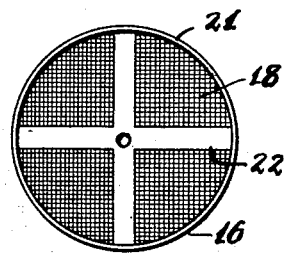
Fig. 3 is a plan view of the second straining element.
Figure 5:
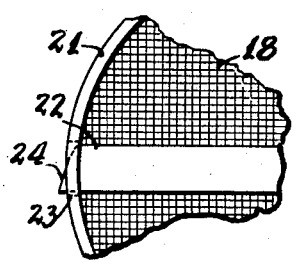
Fig. 5 is a plan view of Fig. 4.

In Figs. 4 and 5 a modification of the invention has been disclosed in which provision is made for holding the straining element at various elevated positions. This is of advantage in that the position may be determined by the level of the liquid in the pot so that efficient straining is had in causing the liquid to pass through the straining elements instead of around the flange 20 which must be a sliding fit within the pot so that the straining element may be moved up and down by the hand 14. More particularly, the top disc 18 is composed of a ring frame 21 and reinforcing arms 22 which project through slots 23 formed in the flange 20. The outer ends 24 of the arms 22 are inclined and act against the inner sides of the pot 10. The inner face of the pot is formed with a plurality of recesses 25 at various elevations which allows the projecting ends 24 to engage therein and hold the straining device as required. The ends 24 may be engaged within the recesses 25 by merely turning a knob 15 which correspondingly turns the straining element.

The operation of the device consists in raising and lowering the knob 15 to cause corresponding motion of the straining element which acts within the liquid, usually coffee, within the pot and causes uniform mixing or stirring of the liquid from the pot so as to maintain the particles within the bottom of the pot. The coffee is placed on the bottom of the pot and below the straining element.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A coffee pot, comprising a pot with a cover, a rod slidable through said cover and having a head at the top end, and a straining element attached upon the bottom of said rod, said straining element comprising a lower disc with coarse openings and an upper disc with finer openings, said lower disc being formed with a peripheral flange and said upper disc being set therein and being associated with a member having radial arms extending through said flange at certain points so as to act against the side of the pot.

2. A coffee pot, comprising a pot with a cover, a rod slidable through said cover and having a head at the top end, and a straining element attached upon the bottom of said rod, said straining element comprising a lower disc with coarse openings and an upper disc with finer openings, said lower disc being formed with a peripheral flange, said upper disc consisting of gauze material held in shape by a metallic frame, said metallic frame engages within the peripheral flanges and extends through slots in the flanges and engages against the sides of the pot so as to frictionally hold the straining element in place.

3. A coffee pot, comprising a pot with a cover, a rod slidable through said cover and having a head at the top end, and a straining element attached upon the bottom of said rod, comprising a lower disc with large perforations and having a peripheral flange, an upper disc set within the flange and having finer perforations and including a frame with arms projecting through openings in said flange so as to engage against the sides of said pot, and recesses within said pot at various elevations to receive the projecting ends of said arms for holding the straining element whenever desired.

4. A coffee pot, comprising a pot with a cover, a rod slidable through said cover and having a head at the top end, and a straining element attached upon the bottom of said rod, comprising a lower disc with large perforations and having a peripheral flange, an upper disc set within the flange and having finer perforations and including a frame with arms projecting through openings in said flange so as to engage against the sides of said pot, and recesses within said pot at various elevations to receive the projecting ends of said arms for holding the straining element whenever desired, the ends of said arms being inclined to facilitate engagement into and from said recesses.

MAURICE C. FERRANDO.